United States Patent
Rowley

(10) Patent No.: US 7,672,935 B2
(45) Date of Patent: Mar. 2, 2010

(54) AUTOMATIC INDEX CREATION BASED ON UNINDEXED SEARCH EVALUATION

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 227 days.

(21) Appl. No.: 11/606,826

(22) Filed: Nov. 29, 2006

(65) Prior Publication Data

US 2008/0126311 A1 May 29, 2008

(51) Int. Cl.
*G06F 7/00* (2006.01)
*G06F 17/30* (2006.01)

(52) U.S. Cl. .............................. 707/3; 709/203; 709/206

(58) Field of Classification Search ...................... 707/2, 707/3, 5, 102
See application file for complete search history.

(56) References Cited

U.S. PATENT DOCUMENTS

| | | | |
|---|---|---|---|
| 5,854,938 A | 12/1998 | Ogi | |
| 6,266,658 B1 * | 7/2001 | Adya et al. | 707/2 |
| 7,188,094 B2 * | 3/2007 | Excoffier et al. | 707/1 |
| 2006/0265377 A1 | 11/2006 | Raman et al. | |
| 2007/0192293 A1 | 8/2007 | Swen | |
| 2007/0294272 A1 * | 12/2007 | Anderson et al. | 707/101 |

* cited by examiner

*Primary Examiner*—Jean M Corrielus
*Assistant Examiner*—Angelica Ruiz
(74) *Attorney, Agent, or Firm*—Blakely, Sokoloff, Taylor & Zafman LLP

(57) ABSTRACT

A method and apparatus for maintaining indices for a Lightweight Directory Access Protocol (LDAP) repository. In one embodiment, the method includes receiving requests for data from a lightweight directory access protocol (LDAP) repository. The method further includes evaluating queries performed for the requests and generating an LDAP index based on an evaluated query.

21 Claims, 6 Drawing Sheets

AUTOMATIC INDEX CREATION BASED ON UNINDEXED SEARCH EVALUATION

TECHNICAL FIELD

Embodiments of the present invention relate to maintaining indices in a Lightweight Directory Access Protocol (LDAP), and more specifically to maintaining indexes of attributes in an LDAP repository.

BACKGROUND

Light Weight Directory Access Protocol (LDAP) has become very popular due to its efficient and fast data access. A large number of applications/services are currently in use and being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person." Membership in the "person" class would require the entry to contain the "sn" and "cn" attributes and allow the entry also to contain "userPassword," "telephoneNumber" and other attributes.

The LDAP server may maintain a set of indexes to increase system performance by allowing the quick retrieval of entries and attribute values corresponding to indexed attributes. A separate index may be maintained for each indexed attribute. Each index may contain a list of attribute values and the corresponding entry identifiers (entry Ids) that contain those values. A system administrator determines which attributes are indexed.

BRIEF DESCRIPTION OF THE DRAWINGS

The present invention is illustrated by way of example, and not by way of limitation, in the figures of the accompanying drawings and in which.

DETAILED DESCRIPTION

Figure 1:
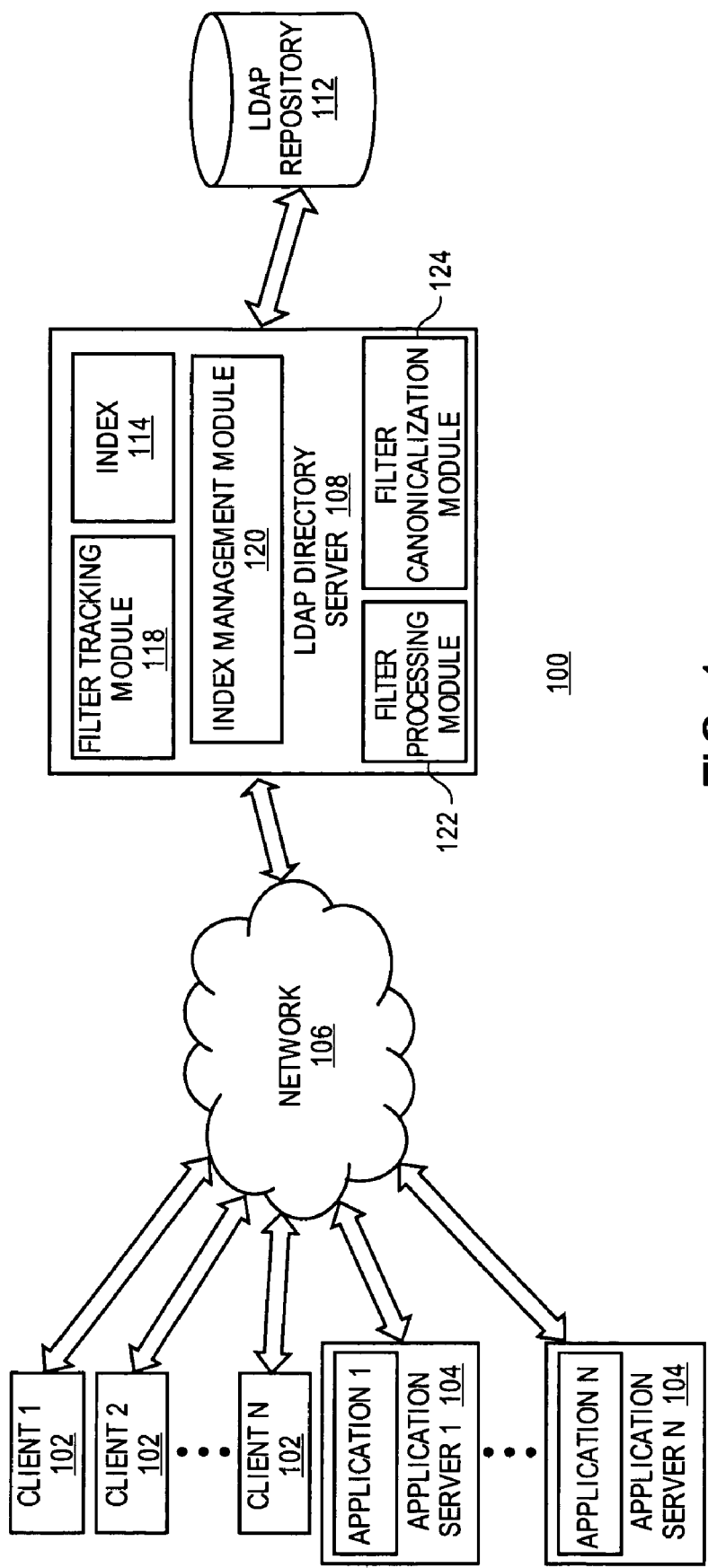
FIG. 1 is a diagram of one embodiment of a network and system including an lightweight directory access protocol (LDAP) server.

Described herein is a method and apparatus for optimizing the indexing for a Lightweight Directory Access Protocol (LDAP) server. Each received filter is analyzed and statistic are maintained regarding all of the received filters. The filters may be canonicalized so that statistics may be maintained equivalent queries. The compiled statistical data may be utilized by the LDAP server to determine a set of indices to maintain. The statistics may be analyzed to determine those indices that, if maintained, would provide the greatest benefit to the LDAP server. New indices may be generated based on this analysis and old less effective indices may be terminated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The network 106 may be a wide area network (WAN), such as the Internet, a local area network (LAN) or similar type of network. The LDAP directory server 108 may contain a server front-end responsible for network communications, plugins or modules for server functions (such as access control and replication), a basic directory tree containing server-related data and a database, back-end plugin responsible for managing the storage and retrieval of LDAP repository data and similar components.

In one embodiment, the clients 102 communicate with the LDAP directory server 108 via a web server (not shown). For example, the clients 102 may execute web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similar to the clients 102, the application servers 104 may communicate with the LDAP directory server 112 directly or via a web server.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class that an entry belongs to defines what kind of object the entry may represent (e.g., a person, organization or domain).

In one embodiment, the LDAP server 108 may include a cache, an index 114, a filter tracking module 118, index management module 120, filter processing module 122, filter canonicalization module 124 and similar modules. In other embodiments, these modules may be implemented as plugins or similarly implemented to provide services to the LDAP server 108. The cache may store entry and attribute data recently retrieved from the LDAP repository 112. The cache is utilized to improve the performance of the LDAP server 108 by providing fast access to the data in the cache that is stored in a local memory or similar storage device instead of retrieving the data from the LDAP repository 112, which is typically an external database stored on a set of magnetics disks and slower than the cache. The LDAP server 108 may maintain an index 114 or set of indices. The index 114 also improves server performance by storing in local memory or storage devices a list of entries for each attribute value. The number of indices and the attributes tracked by the indices may be managed by the index management module 120, may be determined by a system administrator, may have default settings or may be similarly maintained.

An index management module 120 may receive statistical data from the filter tracking module 118 from which it may dynamically generate or remove indices. The index management module 120 may maintain a defined number of indices and the selection of indices to utilize may be based on any combination of statistical data. A system administrator may set the parameters within which the index management module 120 selects the indices to maintain.

The filter tracking module may track a number of statistics related to the filters of the queries received by the LDAP server 108. The statistics tracked by the filter tracking module may include the frequency that a query is received, query evaluation time, timing of the reception of the query (e.g., whether the query was received during a specific time period such as a typically heavy load period for the LDAP server), number of entries processed and similar data tracking.

The filter processing module 122 may handle the execution and interpretation of queries received by the LDAP system 108. The filter processing module 122 and filter tracking module 118 may utilize a filter canonicalization module 124 to standardize the ordering and format of received queries to allow the comparison and tabulation of equivalent filters from queries. The filter canonicalization module 124 may reorder logic and search terms for all filters for received queries in a consistent fashion so that identical queries can be identified.

Figure 2:
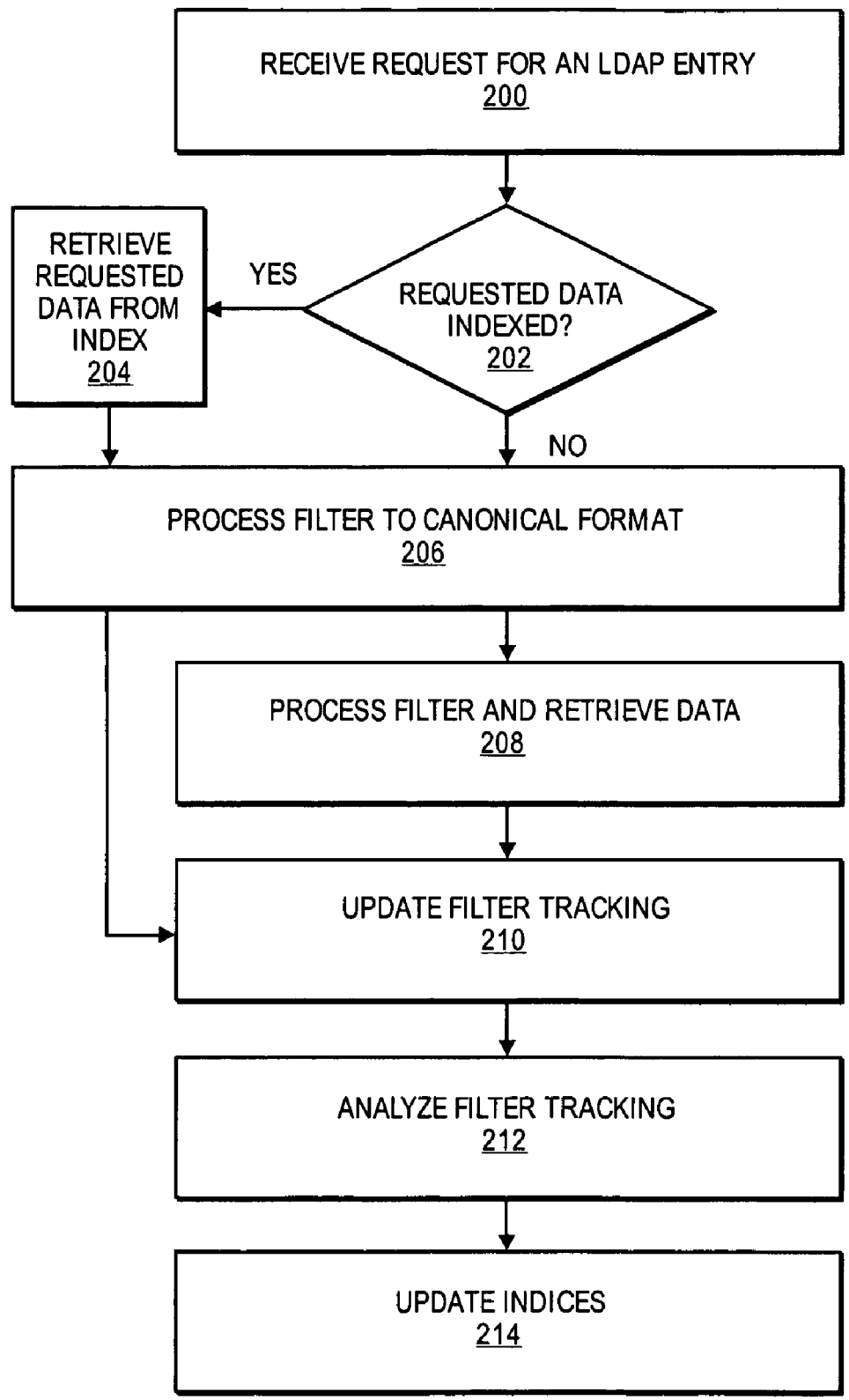
FIG. 2 is a flowchart of one embodiment of a process for index usage tracking and updating.

FIG. 2 is a flowchart of one embodiment of a process for managing indices in an LDAP server. The method may be performed by processing logic that may comprise hardware (e.g., circuitry, dedicated logic, programmable logic, microcode, etc.), software (such as instructions run on a processing device) or a combination thereof. In one embodiment, method 200 is performed by the LDAP directory server 108 of FIG. 1.

Referring to FIG. 2, the method begins with processing logic receiving a request pertaining to data in an LDAP repository (block 200). The request may be received from a client, application server or similar entity and may be in the form of a request for a specific entry or attribute that may simply be retrieved from the LDAP repository and returned to the requesting client. In other cases the request will be in the form of a search or filter or similar LDAP operation. For example, a request may be for the email address of a specific employee. This request may be represented as a query or search for a particular user in the form of a filter that is a logical expression, including search terms and logical operators or similar expressions.

The filter may be applied to generate a candidate list of entries that meet the requirements of the search filter. The candidate list may include a list of entries in the LDAP repository that have attribute values that meet the filter requirements. In the example, a single user entry may be identified and retrieved. If the divisions are large, the number of values for the attribute may be very large.

Each search term corresponding to an attribute may be checked against the available indices (block 202). If an attribute is indexed then the entries with the value specified by the filter may be identified without searching the LDAP repository, thereby improving the efficiency of the system. If an attribute is indexed then the identified entries may then be used to generate the candidate list and ultimately retrieve the data requested by the client and return the requested data to the client (block 204). The filter may be canonicalized (block 206) in order to update filter tracking (block 210), which are discussed in further detail below.

If the filter or attribute is not indexed then the filter may be canonicalized (block 206) and then processed to retrieve the requested data from the LDAP repository (block 208). In another embodiment, where the filter may be processed without canonicalization, the canonicalization may be done in parallel with the retrieval process. The canonicalization being used primarily for the filter tracking.

The canonical filter may be used for filter tracking (block 210). The canonical filter may be used to determine if statistical data is already being tracked for a query and to add the statistics related to the current query to the filter tracking data. The tracked data may be stored to local memory or may be stored in a persistent storage such as the LDAP repository. Any type of data related to the processed filter and query may be stored and tracked including the frequency that a query is received, query evaluation time, timing of the reception of the query (e.g., whether the query was received during a specific time period such as a typically heavy load period for the LDAP server), number of entries processed and similar data tracking.

The collected data may then be analyzed to determine an optimal set of indices to maintain. This may include identifying filters that meet predefined requirements or thresholds to designate them for indexing. Potential indices may be ranked according to any combination of the tracked data and a predetermine number of the highest ranked indices may be generated. Similarly, indices that fall below threshold values or that fall out of the number of selected ranked indices may no longer be indexed and the corresponding index deleted to make room for other indexes. These factors are used to determine how the indices are updated (block 214).

Figure 3:
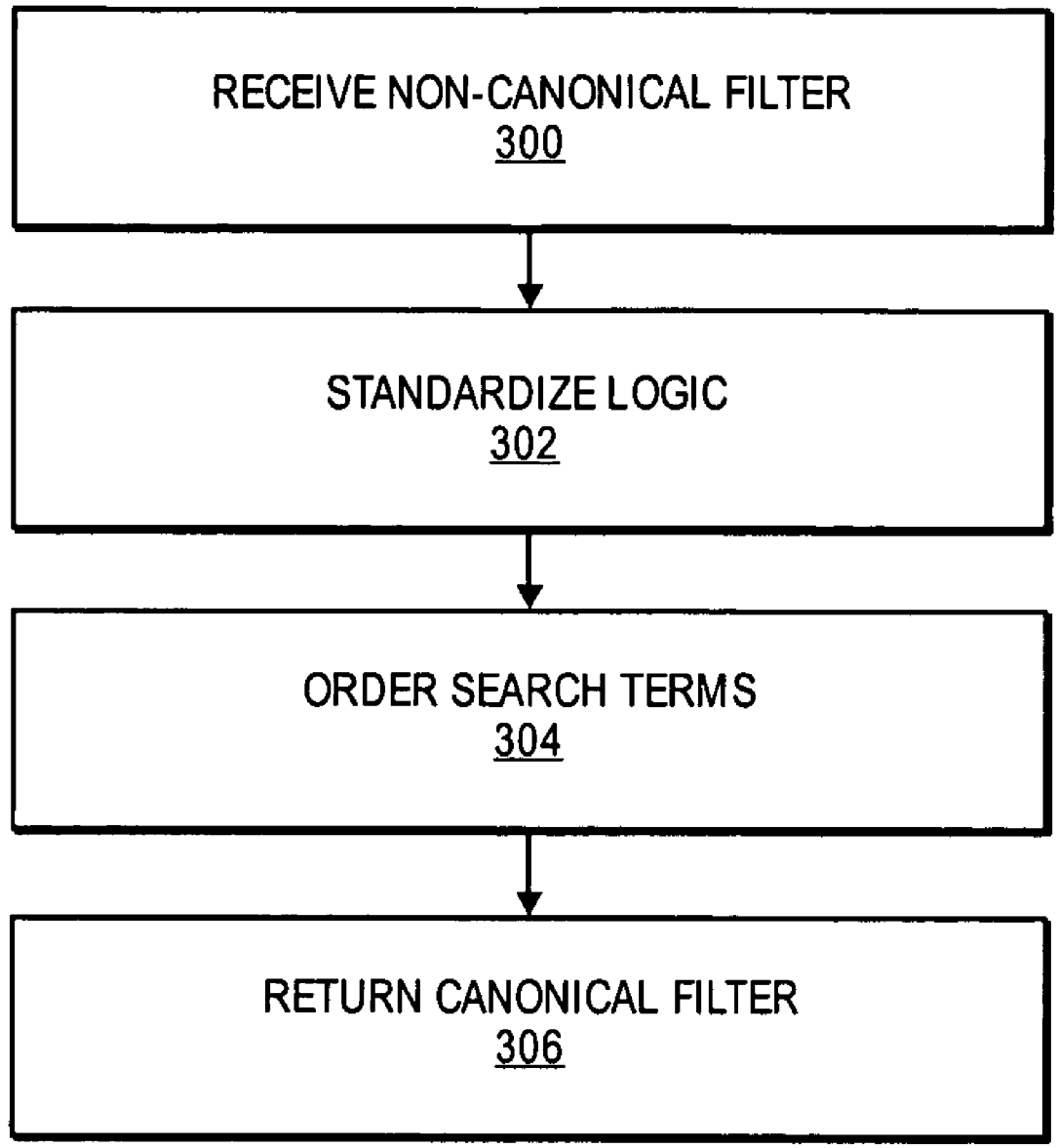
FIG. 3 is a flowchart of one embodiment of a process for filter handling.

FIG. 3 is a flowchart of one embodiment of a process for filter handling. In one embodiment, this process is executed by the filter canonicalization module. In another embodiment, the LDAP server may execute this process or another module such as a plugin module may execute the process. The process may be initiated by the LDAP server or another module forwarding a filter for processing (block 300). The filter may be a part of a query received from a client or application server or may be derived therefrom.

The filter may include a set of search terms along with logic relating the search terms to one another. For example, a filter searching for an entry in the LDAP server specifying one of two first names and a last name may be: (&(|(firstname=joe)(firstname=joey))(lastname=smith)). An equivalent query may be received as: (|(&(firstname=joe)(lastname=smith))(&(firstname=joe)(lastname=smith))).

The logic may be reordered using well known properties of Boolean logic such as the associative and communicative properties to place the logic in a standard format (block 302). For example, all filters may be logically reordered to the form of a disjunction (i.e. a sum of products) or a conjunction (i.e., a product of sums). Any type of standard or canonical form may be utilized for the logic.

The terms may also be reordered to further the canonicalization of the filter. Any scheme for ordering the search terms may be used including alphabetical ordering, uniqueness of search terms and similar ordering criteria. The uniqueness of search terms may be determined based on the number or entries in the database that correspond to the term, where the fewer the number of entries the more unique the search term. Uniqueness may be tracked by a separate process or may be set or determined by an administrator or by a defaulting setting or a similar mechanism.

Search terms may be ordered from most unique to least unique. This order may correspond to the order of evaluation. If the most unique terms are evaluated first the search process may be more efficient because less unique terms may require the evaluation of large numbers of entries if evaluated before the more unique terms. For example, if a search is for: (&(email=joesmith@company.com)(lastname=smith)), the first term is likely to return a single entry making the further application of the second term to the resulting candidate list efficient. Whereas, if the terms are switched in order, a large number of entries may be returned, which may then have to be searched individually. This assumes that the first term is indexed while the second term is not indexed.

In one embodiment, the search terms may first be ordered based on whether they are indexed. Indexed search terms are the fastest to evaluate because each of the candidate entries can be quickly retrieved from the index. Unindexed search terms require that each candidate entry be checked, which if the first term that is evaluated is unindexed may result in a length search of the LDAP repository.

Once the search terms are reordered, the filter is in a canonical state and may be returned to the requesting program or module (block 306). In another embodiment, the ordering of the search terms may precede the organization of the logic.

Figure 4:
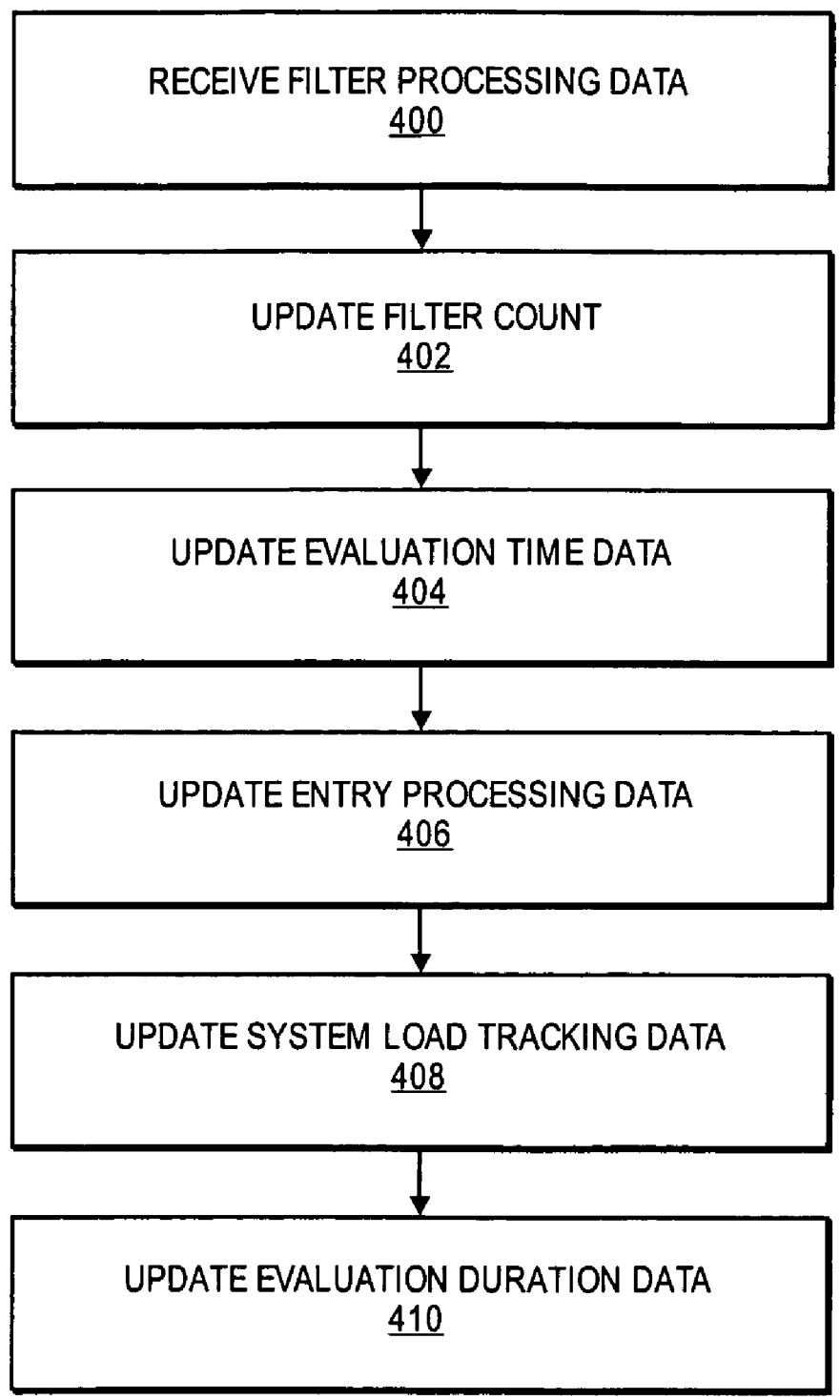
FIG. 4 is a flowchart of one embodiment of a process for index statistics tracking.

FIG. 4 is a flowchart of one embodiment of a process for index statistics tracking. In one embodiment, this process begins with the reception of a filter processing request (block 400). The filter may be canonicalized to allow it to be compared and grouped with other previously processed filters. The results and the statistics related to the processing of the data may have been tracked or compiled during the processing of the filter or may be determined during the update process. The update of the tracked filter statistics may be done in a particular sequence, in any sequence, in parallel or similarly implemented. A sequential implementation is discussed herein for sake of clarity.

The statistical data may be tracked in a specialized cache, data structure, storage device or similar location. The statistical data may also be stored in the LDAP repository or in other locations within the LDAP server. A count of the number of times that a filter has been processed may be tracked (block 402). The count may be restricted to a set time period, for example over a period of an hour, day, month, year or similar time period or similarly limited. The count may be used as a general indicator of the frequency at which the query or particular attributes are requested.

The time or time period during which a filter was received and processed may be recorded or added to a tally or log of such activities. This data may be used to determine time periods during which particular queries are commonly made. For example, some queries may be primarily received during the morning when employees first arrive at work. This type of data may be used to indicate that certain indices may be generated and maintained during certain time periods of the day, on certain days, months or during other time periods or events.

The number of entries, attributes or attribute values that are processed in relation to a filter may be tracked or logged (block 406). A continuous average may be maintained, mean score determined or similar indicator of the processing resources or time require to service a filter. This data may be used to prioritize complex, large or slow filters or search terms for indexing to improve performance. This data may also be used to determine the uniqueness of search terms.

The system resources available during the processing or at the time a filter was received for processing may be tracked or logged (408). This data may be used to determine high traffic times and identify the queries or filters that are often processed during this time. The identified filters may be prioritized for indexing during these heavy utilization periods to minimize the strain on system resources.

The time it takes to complete the evaluation of a filter or query may be tracked or logged (410). The time to complete the evaluation of a filter or query may be utilized as an indicator of filter complexity and resource utilization. Slow filters or queries may be prioritized for indexing.

Figure 5:
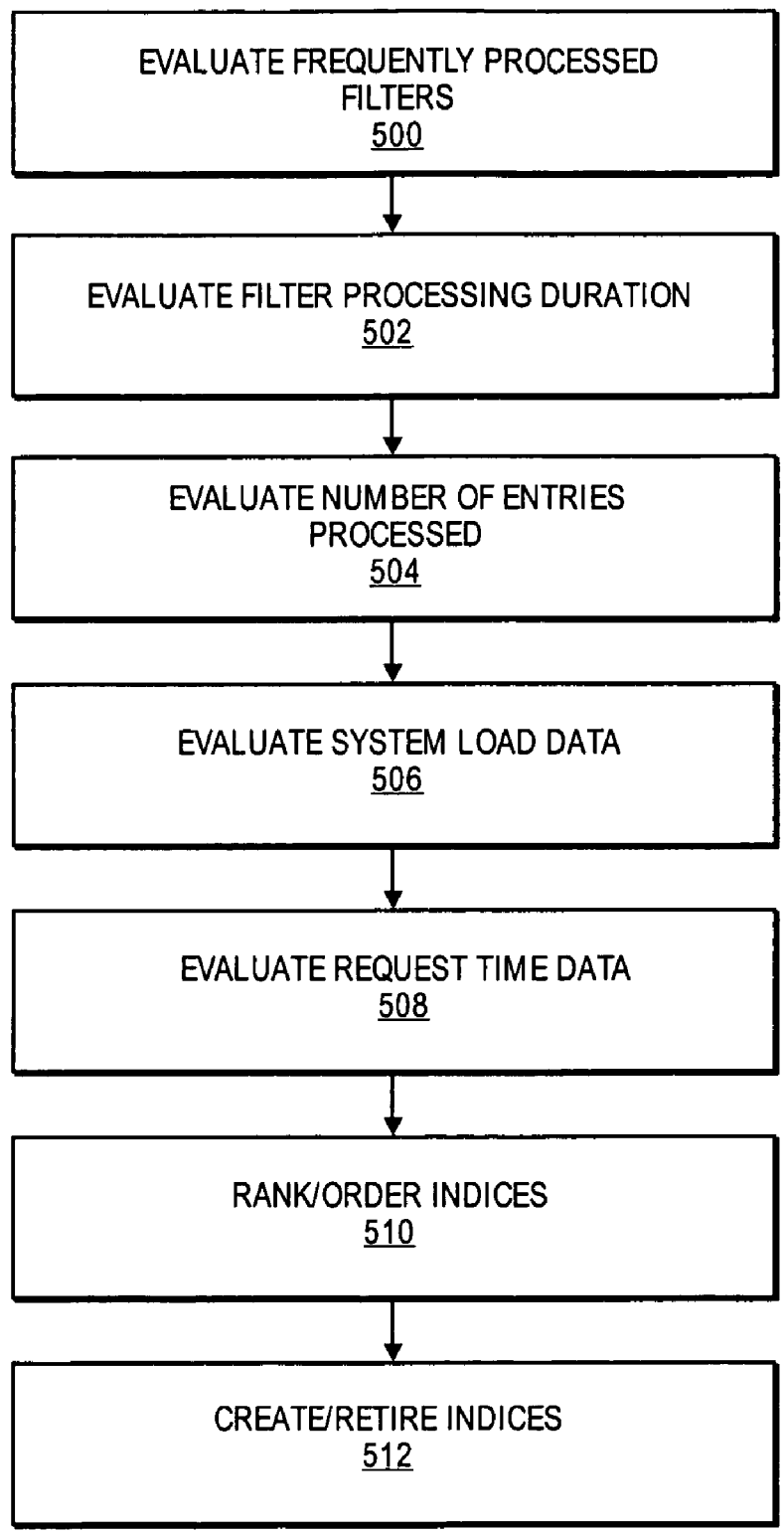
FIG. 5 is a flowchart of one embodiment of a process for dynamic index management.

FIG. 5 is a flowchart of one embodiment of a process for dynamic index management. In one embodiment, different statistical characteristics of the filters may be evaluated separately. In another embodiment, the statistics may be combined in any combination, weighting or algorithm to rank the filters to indicate which filters would improve system performance if indexed.

In one embodiment, a check may be made to determine the most frequently processed or accessed filters or search terms (block 500). These filter and search terms may be determined by ordering the filters based on the filter count that indicates the number of times the filter was processed during a defined time period. Prioritizing these filters would improve system performance due to the large number of accesses to the slow LDAP repository.

Each tracked filter may be evaluated for its processing duration. This duration may be an average duration, mean duration, median duration or similar representation of the duration (block 502). The tracked filters may be ranked or ordered based on longest duration indicating those filters that would most improve system performance if indexed. A similar metric is the number of entries processed (block 504). An average number, mean number, median number or similar representation of the number entries processed may be used to rank the filters. The filters with the highest number of processed entries may be ranked or ordered highest for indexing.

The system load data may be represented by an average load, mean load, median load, peak load or similar representation of the load at the time the filter was processed (block 506). A filter or search term that is frequently accessed during peak times may be ranked or ordered higher than other search terms for indexing. A similar or related metric that may be tracked is the filter processing timing (block 508). This may indicate a time period, date or similar indication of the time that a particular filter is processed. The most commonly processed filters may be ordered or ranked highest for a given time period.

Any combination of these statistics may be combined to further reorder or rank the filters and/or search terms. In one embodiment, each factor may be weighted and an overall score given for each filter. An administrator may set which of the factors are given the greatest weight and utilized in the calculation of the overall score of each filter or search term or default settings may be provided and utilized.

An administrator may set a number of indices to maintain or a default may be set. In another embodiment, any number of indexes may be maintained so long as they exceed a threshold score indicating improved efficiency or similarly are determined to offer a significant benefit in system performance. The top ranked filters and searches of those that exceed a threshold may be designated to be indexed. Similarly, each filter or search term that does not exceed the threshold or is not ranked within the assigned number may be deleted or decommissioned as an index to limit the amount of system resources consumed.

Figure 6:
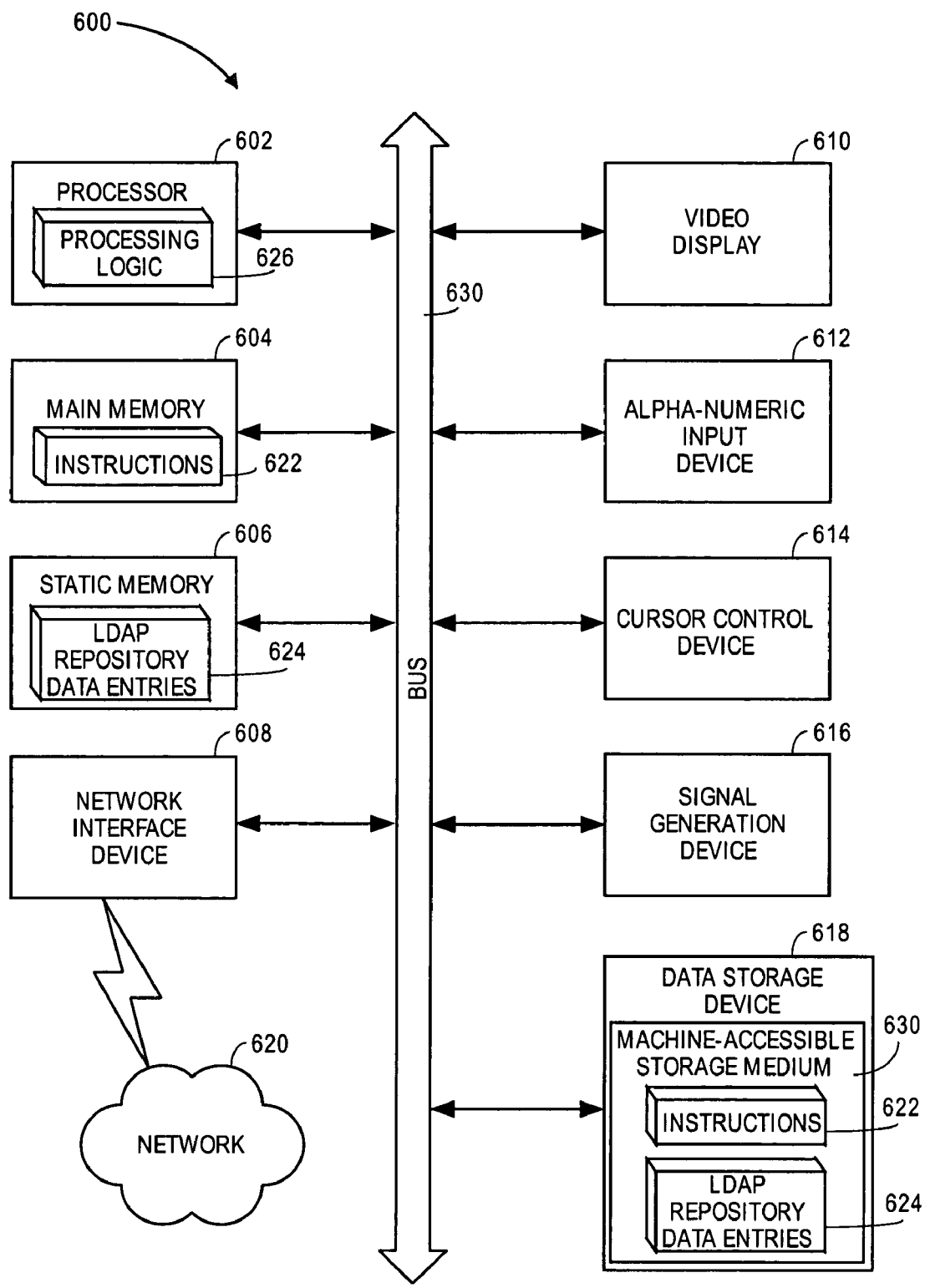
FIG. 6 is a diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 may represent one or more general-purpose processing devices such as a microprocessor, central processing unit or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store LDAP repository data entries 624. LDAP repository data entries 624 may also be stored in other sections of computer system 600, such as static memory 506.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for invoking actions on data via LDAP requests have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving a request, at a lightweight directory access protocol (LDAP) directory server, to retrieve data from a LDAP repository communicably coupled to the LDAP server, wherein the request is in the form of a filter that is a logical expression including search terms related to the data;
evaluating, by the LDAP server, the filter in terms of statistical data being tracked by the LDAP server;
adding, by the LDAP server, statistical data related to the filter to a set of filter tracking data maintained by the LDAP server for one or more filters, wherein the filter tracking data includes at least one of an access frequency of each filter, an evaluation time of each filter, a time that a request for each filter is received, system load when the request for each filter is received, and a number of entries processed for each filter;
generating, by the LDAP server, one or more LDAP indices for each of the one or more filters;
selecting, by the LDAP server, a defined number of the one or more LDAP indices with a highest dynamic ranking to maintain in the LDAP repository, wherein the dynamic ranking is determined from the statistical data determined for the filter associated with each LDAP index; and
deleting, by the LDAP server, a remaining one or more LDAP indices that are not selected for maintenance;
wherein the filter tracking data is updated each time the LDAP server receives another request, and the selecting and deleting the remaining one or more LDAP indices is repeated using updated dynamic rankings based on the updated filter tracking data on an on-going basis.

2. The method of claim 1, wherein evaluating queries comprises:
collecting characteristics of the filter.

3. The method of claim 2, wherein the statistical data of the filter includes at least one of a frequency, evaluation time, time that the request is received, system load when the request is received, and a number of entries processed for the filter.

4. The method of claim 1, further comprising:
formatting the filter to a canonical format.

5. The method of claim 1, further comprising:
generating the one or more LDAP indices for the one or more filters with the highest request frequencies.

6. The method of claim 1, further comprising:
generating the one or more LDAP indices for the one or more filters if the one or more filters meet a condition, the condition including any one of the filter having a long evaluation time, occurring during a specified time frame, occurring during high system load and processing a large number of entries.

7. The method of claim 1, wherein deleting the one or more remaining LDAP indices further includes deleting an LDAP index from the LDAP repository if its dynamic ranking falls below a threshold level.

8. The method of claim 4, wherein formatting the filter further comprises:
reordering logic in the filter; and
reordering search terms in the filter.

9. The method of claim 1, further comprising:
generating a report based on the filter tracking data.

10. A system comprising:
a lightweight directory access protocol (LDAP) repository;
a LDAP directory server including a tracking module to track statistical data related to LDAP queries that are each in the form of a filter that is a logical expression including search terms related to data to be retrieved for the query, wherein the statistical data includes at least one of an access frequency of each filter, an evaluation time of each filter, a time that a request for each filter is received, system load when the request for each filter is received, and a number of entries processed for each filter; and
an index management module as part of the LDAP directory server to:
evaluate the filters in terms of their associated statistical data in order to determine a dynamic ranking for each filter;
generate one or more LDAP indices for each of the filters;
select a defined number of the one or more LDAP indices with a highest dynamic ranking to maintain in the LDAP repository; and
delete one or more remaining LDAP indices that are not selected for maintenance;
wherein the statistical data is updated each time the LDAP directory server receives another query, and the index management module to repeatedly select and delete the one or more remaining LDAP indices using updated dynamic rankings based on the updated statistical data on an on-going basis.

11. The system of claim 10, wherein the LDAP server further comprises:
a filter processing module to generate a canonical query format.

12. The system of claim 10, wherein index management module deletes the one or more remaining LDAP indices if their dynamic ranking falls below a threshold level.

13. An article of manufacture, comprising a machine-accessible storage medium including data that, when accessed by a machine, cause the machine to perform a method comprising:
receiving a request, at a lightweight directory access protocol (LDAP) directory server, to retrieve data from a LDAP repository communicably coupled to the LDAP server, wherein the request is in the form of a filter that is a logical expression including search terms related to the data;
evaluating, by the LDAP server, the filter in terms of statistical data being tracked by the LDAP server;
adding, by the LDAP server, statistical data related to the filter to a set of filter tracking data maintained by the LDAP server for one or more filters, wherein the filter tracking data includes at least one of an access frequency of each filter, an evaluation time of each filter, a time that a request for each filter is received, system load when the request for each filter is received, and a number of entries processed for each filter;
generating, by the LDAP server, one or more LDAP indices for each of the one or more filters;
selecting, by the LDAP server, a defined number of the one or more LDAP indices with a highest dynamic ranking to maintain in the LDAP repository, wherein the dynamic ranking is determined from the statistical data determined for the filter associated with each potential LDAP index; and
deleting, by the LDAP server, one or more remaining LDAP indices that are not selected for maintenance;
wherein the filter tracking data is updated each time the LDAP server receives another request, and the selecting and deleting the one or more remaining LDAP indices is repeated using updated dynamic rankings based on the updated filter tracking data on an on-going basis.

14. The article of manufacture of claim 13, wherein evaluating queries comprises:
collecting characteristics of the filter.

15. The article of manufacture of claim 14, wherein the statistical data of the filter includes at least one of a frequency, evaluation time, time that the request is received, system load when the request is received, and a number of entries processed for the filter.

16. The article of manufacture of claim 13, further comprising:
generating the one or more LDAP indices for the one or more filters with the highest request frequencies.

17. The article of manufacture of claim 13, wherein deleting the potential LDAP indices further includes deleting one of the one or more remaining LDAP indices from the LDAP repository if its dynamic ranking falls below a threshold level.

18. The article of manufacture of claim 13, further comprising:
generating a report based on the filter tracking data.

19. The article of manufacture of claim 13, further comprising:
generating the one or more LDAP indices for the one or more filters if the one or more filters meet a condition, the condition including any one of the filter having a long evaluation time, occurring during a specified time frame, occurring during high system load and processing a large number of entries.

20. The method of claim 1, wherein selecting one or more of the LDAP indices to maintain further includes selecting LDAP indices whose dynamic ranking is above a threshold level.

21. The article of manufacture of claim 13, wherein selecting one or more of the LDAP indices to maintain further includes selecting LDAP indices whose dynamic ranking is above a threshold level.

* * * * *